United States Patent [19]

Herce et al.

[11] 3,869,408

[45] Mar. 4, 1975

[54] METHOD AND APPARATUS FOR CONTINUOUSLY SEPARATING EMULSIONS

[75] Inventors: John A. Herce, Bellaire; James E. Heath, Houston, both of Tex.

[73] Assignee: Shell Oil Company, Houston, Tex.

[22] Filed: July 13, 1972

[21] Appl. No.: 271,441

[52] U.S. Cl. .............................................. 252/361
[51] Int. Cl. ............................................ B01d 19/00
[58] Field of Search ........... 252/360, 324, 325, 417; 210/24, 40; 208/11

[56] References Cited
UNITED STATES PATENTS

| | | | |
|---|---|---|---|
| 1,742,220 | 1/1930 | Richter | 210/40 |
| 1,944,480 | 1/1934 | VanLoenen | 252/360 X |
| 2,018,302 | 10/1935 | Fisher | 252/360 X |
| 2,607,714 | 8/1952 | Smucker | 252/360 X |
| 3,147,216 | 9/1964 | Oemler | 210/40 |
| 3,382,170 | 5/1968 | Pape | 210/40 X |
| 3,405,059 | 10/1968 | Sprow | 210/40 |
| 3,414,511 | 12/1968 | Hitzman | 210/40 |
| 3,464,920 | 9/1969 | Pirson et al. | 210/40 X |
| 3,574,098 | 4/1971 | Boorujy | 210/62 |
| 3,607,741 | 9/1971 | Sohnius | 210/36 |
| 3,619,406 | 11/1971 | Bowman et al. | 208/11 |

Primary Examiner—Jack Sofer
Attorney, Agent, or Firm—Fredrik Marlowe

[57] ABSTRACT

Method and apparatus for continuously separating disperse phase and continuous phase from a liquid-liquid emulsion. In one embodiment, oil-water emulsion is flowed into a contacting zone in which the emulsion is agitated with a fibrous, solid material such as shredded newspaper. Water having an oil content of less than 10 parts per million is continuously withdrawn near the bottom of the contacting zone and oil is continuously withdrawn near the top of the contacting zone.

8 Claims, 2 Drawing Figures

METHOD AND APPARATUS FOR CONTINUOUSLY SEPARATING EMULSIONS

BACKGROUND OF THE INVENTION

1. Field of the Invention

This invention relates to the field of breaking emulsions and more particularly to method and apparatus for treating oil-in-water emulsions to separate oil and water therefrom.

2. Description of the Prior Art

The removal of oil from industrial waste waters is a problem of major current interest, particularly in the petroleum industry. Oil field produced waters, tanker ballast liquid, and refinery effluents are examples of fluids which may contain oil-water mixtures. The oil contained in such mixtures may be of significant value if separated and recovered. Additionally, and in some cases more importantly, if the oil is removed from the mixture, the water phase may be suitable for return to natural streams, lakes, or oceans. This can save large expense required to dispose of oil-containing water by alternate means.

No uniform governmental standard presently exists for the maximum oil content of liquid waste which may be discharged into natural waters. However, in some areas proposed pollution control regulations set a maximum limit of 30 ppm oil.

In some cases, oil and water may be adequately separated to meet the proposed standard merely by allowing the mixture to sit for a short time in a quiescent settling zone where water sinks to the bottom and oil rises to the top. In other cases, the oil and water from an emulsion in which one of the liquids is relatively stably distributed in the form of disperse droplets in the other liquid, the "continuous phase." Usually such emulsions will not separate by mere settling. Further treatment is required to "break" them into their constituent liquids.

Exemplarly prior art methods for separating emulsions into separate components include imposing electrical fields on the emulsion to cause dispersed drops to rapidly collide with one another and thereby coalesce into larger drops which may be more easily separated from the mixture. Similar results have been achieved by adding chemical agents or "demulsifiers" which promote coalescence of dispersed droplets into larger drops. These drops can then be separated from the continuous phase by settling.

Another method of separating disperse phase from an emulsion is to contact the emulsion with a solid which is preferentially disperse-phase wet. For example, in an oil-in-water emulsion, oil is collected on an oil-wet material and coalesced into masses of such size as will readily stratify, e.g., see U.S. Pat. No. 1,887,774 to Meinzer, issued Nov. 15, 1932, U.S. Pat. No. 3,405,059 to Sprow, issued Oct. 8, 1968, and U.S. Pat. No. 3,152,196 to Marziani, issued Oct. 6, 1964. In these prior techniques it usually has been necessary to pass a mixture of water and coalesced oil droplets to a separate settling zone or through separating means in which liquids segregate due to density differences.

It is also known to break emulsions by agitating the emulsion with a disperse-phase collecting solid. For example, with an oil-in-water emulsion, it is known to separate the oil from the emulsion by agitating with an oil attracting solid. The solid and attached oil is then removed from the mixture by filtration, settling or other means. The solid can be discarded as waste or separately treated to remove oil and then reused. Patents exemplary of this technique are U.S. Pat. No. 705,253 to Krause, issued July 22, 1902, U.S. Pat. No. 3,147,216 to Oemler, issued Sept. 1, 1964, and U.S. Pat. No. 3,580,844 to Fratzsher et al., issued May 25, 1971.

None of these prior art methods has been entirely effective to date in all applications. Collection of oil on oil-attracting solids has the disadvantage of creating oil-soaked solid waste material which must in turn be treated or disposed of. Processes which require quiescent settling zones are disadvantageous where large volumes of fluid must be treated. In many such applications, such processes may be entirely adequate with respect to efficiency in separating oil from water given sufficient time. However where great amounts of fluid are involved, as in industrial operations of the type mentioned above, provision of containers to hold liquids to be treated during settling may require prohibitively large capital investment.

For example, an offshore oil production facility may handle as much as one hundred thousand or more barrels per day of produced water. Using conventional settling techniques these waters can often be reduced in oil content to about 1,000 ppm in a relatively short time. However using prior emulsion breaking techniques to separate the remaining oil content, which often is in the form of dispersed drops on the order of 1–10 microns in diameter, may take additional settling time of several days up to weeks or more. Facilities for handling such large volumes of fluid are rarely available on offshore platforms.

If the oil contained in this water could be continuously separated, the water might be suitable for return to the ocean or other body of water in which the platform is located. However, there is no currently available continuously operating commercial emulsion breaking process which can attain the 30 ppm oil concentration required by proposed governmental regulations. Therefore, expensive alternate provisions must be made for disposing of this oil-containing water.

SUMMARY OF THE INVENTION

A method has now been found for continuously separating disperse phase and continuous phase from a liquid-liquid emulsion without providing large settling zones by contacting the emulsion in a contacting zone with a substantially disperse-phase saturated, disperse-phase trapping, fibrous material suspended in a liquid and separating substantially disperse-phase free continuous phase from the fibrous material. In one preferred embodiment substantially solids-free disperse-phase and continuous phase are separately withdrawn from the contacting zone.

In this patent application "disperse-phase trapping, fibrous material" means a material which retains disperse phase, e.g. oil in an oil-in-water emulsion, by a physical trapping mechanism in which a droplet or bubble of disperse-phase is retained between two or more fibers without necessarily touching or adherring to the fibers. "Disperse-phase saturated" means that the material is at an equilibrium trapped disperse-phase content with respect to prevailing conditions in the contacting zone whereby the material will retain little or no additional disperse phase at these conditions. As used herein "water" is meant to include fresh water, brine and other aqueous solutions having similar wetting characteristics.

The disperse-phase trapping, fibrous material is one which is preferentially wet by the continuous phase of the emulsion. Thus, a preferred fiber for use in an oil-in-water emulsion wherein water is the continuous phase is one which is preferentially water wet. Water-soaked shredded cellulose fibers have been found to give excellent results with such emulsions. A particularly advantageous cellulose material is paper, especially newsprint. An attractive source of newsprint is waste newspaper which is widely available at low cost.

The suspended fibrous material is advantageously agitated in the contacting zone with the emulsion to promote contact of disperse-phase droplets with the fibers. For best results the agitation is conducted with an intensity less than a maximum value at which size reduction of a significant portion of relatively large disperse-phase droplets formed in the separation process occurs. Such droplet size reduction leads to reemulsification of separated oil. The particular agitation intensity at which re-emulsification occurs varies according to process conditions such as temperature, relative density of the emulsion phases, and the magnitude of interfacial forces between the phases. One skilled in the art will have no problem determining this maximum agitation intensity for a particular set of system parameters.

The fibers employed in the process should be of sufficient length to intertwine to form groups or clumps of two or more fibers capable of trapping disperse-phase droplets between the fibers. The fibers, however, should not be so long that entangled clumps of fibers are formed which contain major portions, e.g. 5 percent or more, of the fibers in the contacting zone. Fibers in the range of 100-10,000 microns are suitable in most applications. Excellent results have been obtained in separating disperse-phase droplets having a mean diameter in the range of 2-10 microns using fibers having a mean diameter of 10-15 microns and mean lengths of about 200-2,000 microns.

The concentration of fibers in the contacting zone should be sufficiently high to maintain a substantial proportion of the fibers in disperse-phase trapping, fiber to fiber contact and still low enough to keep the effective viscosity of the slurry of fibers in the contacting zone low enough to allow coalesced disperse-phase droplets to move vertically within the contacting zone at practical rates under gravitational and buoyancy forces. Concentration limits for best results will vary from system to system with variations in characteristics of particular emulsions and fibers encountered.

In treating oil-in-water emulsions using shredded newspaper or newsprint as the fiber, preferred paper concentrations are within the range of 500 ppm to 20,000 ppm. Particularly good results have been achieved with newspaper concentrations in the range of 2,000 ppm to 5,000 ppm.

According to a preferred embodiment of the present invention, oil is continuously separated from a dilute emulsion of oil-in-water, e.g. an emulsion containing about 30-5,000 ppm oil in dispersed droplets of diameter about 50 microns or less, by a method comprising the steps of: continuously adding emulsion to a contacting vessel containing an aqueous suspension of an oil-saturated, oil-trapping fibrous material; agitating the contents of the vessel; and withdrawing a substantially solids-free stream of liquid oil from a point adjacent the top of the vessel and a water phase from a point adjacent the bottom of the vessel. Shredded cellulose has been found to be a particularly effective oil-trapping fibrous material. A preferred shredded cellulose material is shredded newsprint.

The process can be initiated by loading the vessel with an aqueous suspension of oil-trapping, fibrous material which may or may not be oil-saturated. If the aqueous suspension of oil-trapping fibrous material is not initially oil saturated, emulsion can be added to the vessel while agitating the contents of the container. The oil-trapping fibrous material traps oil thereby increasing its oil content until it becomes oil-saturated. Thereafter, the fibrous material continues to be effective in separating oil from the emulsion. A water phase may be withdrawn from a point adjacent the bottom of the contacting vessel during the fibrous material oil-saturating step.

According to one preferred embodiment, the water phase withdrawn from the contacting vessel is passed through a filter medium which removes fibrous material from the water. Concurrently, fibers can be continuously removed from the filter and returned to the aqueous suspension in the vessel without requiring any further treatment.

In another embodiment, water containing some oil-saturated fibrous material is withdrawn from the vessel. The fibrous material and trapped oil are separated from the water by means such as air flotation cells or a hydroclone and then returned to the container. This method of separating water from the oil trapping fibrous material may be particularly advantageous where the emulsion stream from which oil and water are to be separated contains substantial amounts of fine solid material, such as sand particles, which might plug a filter.

Preferred apparatus for separating oil from an oil-in-water emulsion in accordance with the present invention comprises an enclosed vessel having an inlet through which emulsion may be admitted to the vessel, an outlet adjacent the top of the vessel for withdrawing oil and an outlet adjacent the bottom of the vessel for withdrawing aqueous phase. The vessel is loaded with oil-trapping fibrous material. Means for agitating the vessel contents extends into the vessel. Advantageously, means for removing fibrous material from the aqueous phase is associated with the aqueous phase outlet means.

In some cases the fiber removing means may be positioned externally of the vessel. In such an instance means are preferably provided for returning fibrous material which has been removed from the aqueous phase to the vessel.

DESCRIPTION OF A PREFERRED EMBODIMENT

Figure 1:
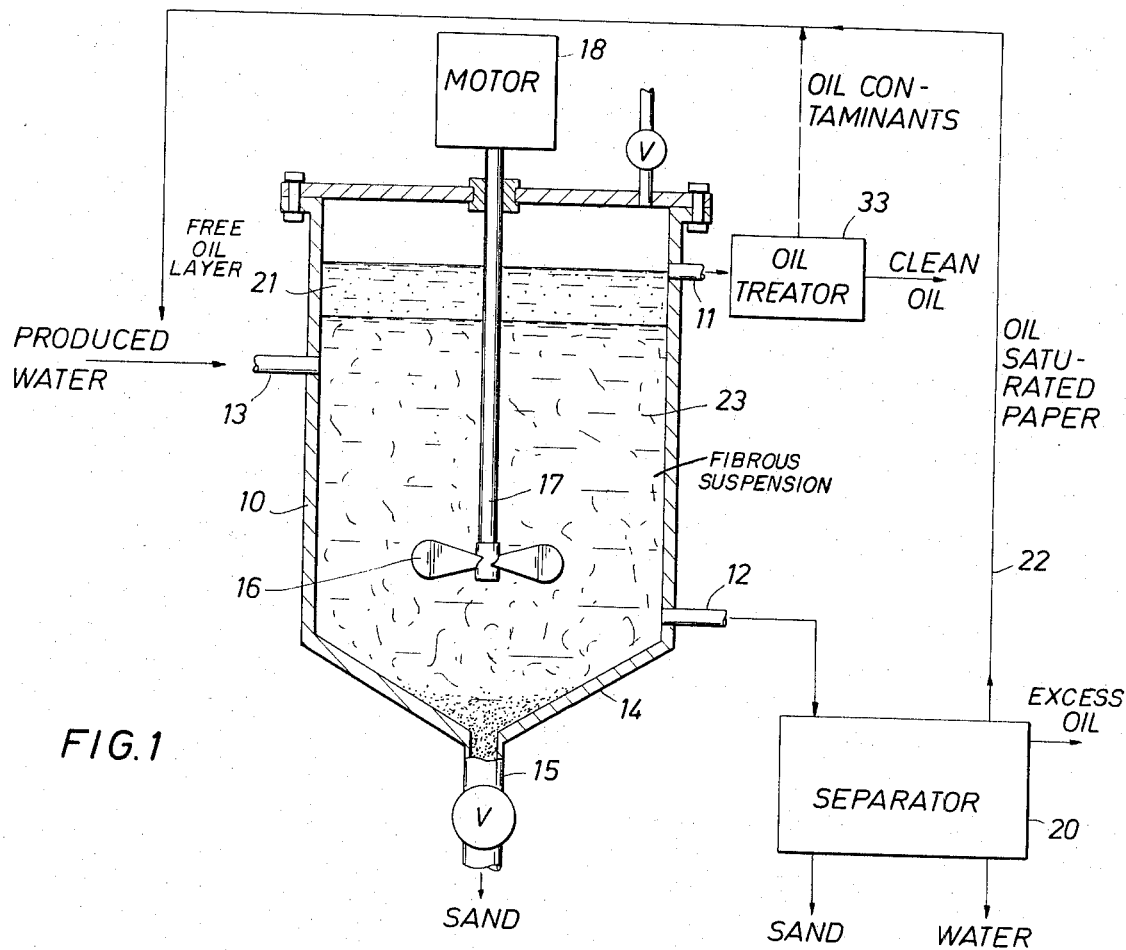
FIG. 1 is a schematic diagram, partially in cross-section and partially in block form of apparatus suitable for separating the phases of an emulsion according to the method of this invention.

Referring to FIG. 1, we see a contacting vessel 10 suitable for use in separating the phases of an emulsion according to the method of this invention. The operation of the vessel 10 will be described with respect to the separation of oil from an oil-in-water emulsion such as a produced oil field brine which contains a minor amount of oil, e.g. less than 4 percent and typically less than 5,000 ppm, but which has an oil content in excess of the 30 ppm oil content guideline for returning produced brine to the sea.

The vessel is provided with an oil outlet 11 near the top thereof and an aqueous phase outlet 12 near the bottom thereof. A produced water inlet 13 is positioned along the lateral side of the vessel 10 and opens into the vessel at a point vertically between the oil outlet 11 and the aqueous phase outlet 12. The vessel 10 preferably has a conical bottom 14 for collecting particulate solids, such as sand, which may be present in the produced water. A discharge pipe 15 for periodically withdrawing accumulated sand is positioned at the lower end of the conical bottom 14. Agitating means, such as impeller 16 mounted on shaft 17 and driven the motor 18, is positioned in the central portion of the vessel for agitating the contents thereof.

The contacting vessel 10 is loaded with a liquid suspension of a fibrous material. The liquid is preferably the emulsion to be broken or the continuous phase of that emulsion. The fibrous material is advantageously a dispersed-phase trapping material as heretofore described. For separating oil from oil-in-water emulsions, a preferred fiber is a shredded cellulose material such as shredded newsprint or shredded waste newspaper. The fibers preferably have a length in the range of 100–10,000 microns. Excellent results have been obtained with shredded newspaper fibers in the range of 200–2,000 microns long and 10–15 microns in diameter.

The fiber concentration is preferably within the range of 500 ppm to 20,000 ppm. The fiber selected is advantageously predominantly continuous-phase wet, e.g. water-wet as is water-soaked newsprint. Such material remains in the continuous phase of the emulsion and does not flow out of contacting vessel 10 with separated oil.

In operation, produced water (brine) is continuously flowed into contacting vessel 10 through inlet 13. Simultaneously, the contents of the vessel 10 are agitated by agitating means 16 at an intensity less than that intensity at which a substantial part of the oil which may be liberated from the produced water flowing into the content vessel is re-emulsified. At the same time, free oil is withdrawn through oil outlet 11 and an aqueous phase is withdrawn through outlet 12. The rates of liquid flow into and out of the vessel are preferably regulated to keep the fluid level in the vessel substantially constant.

If the vessel 10 is initially loaded with fresh fibrous material which contains no oil, no free oil layer will be present in the vessel 10 during the initial stages of operation. This is an oil-saturating period wherein the oil-trapping fibrous material traps oil until it comes to an equilibrium saturation. The amount of oil retained to equilibrium is dependent upon operating conditions such as temperature and intensity of agitation, and upon the physical properties of the fiber, oil, and water in the vessel 10. During this fibrous material saturation period, emulsion can be continuously added to, and aqueous phase withdrawn from, the contacting vessel 10.

After the fibrous material in the contacting vessel reaches equilibrium saturation, further addition of oil to the vessel results in the formation of relatively large free-oil droplets which in most applications rise in the vessel 10 to form a free-oil layer 21 floating on top of the aqueous suspension of shredded newsprint in contacting zone 23. Thereafter, the rate of oil accumulation in the free oil layer 21 is usually substantially equal to the rate of oil flow into the vessel 10. However, in some applications the flow rate of fluid through the contacting vessel 10 is great enough to carry a significant amount, and in some cases substantially all, of the free oil droplets formed in the vessel 10 through conduit 12 as part of the aqueous phase effluent. In such cases a reduced amount of oil, if any, will collect in free oil layer 21.

The aqueous phase withdrawn through the outlet 12 may contain some substantially oil-saturated fibrous material as well as some particulate solids, coalesced oil droplets and unbroken emulsion. Therefore, this liquid is preferably treated in separator means 20 to remove these contaminants. The separator means 20 can comprise a filter means of any conventional type capable of screening out the fibrous solids. We have found that when a filter is used, a filter-cake of fibrous solids builds up on the filter and effectively traps, or otherwise screens out, both coalesced and uncoalesced oil droplets from the aqueous phase, thereby providing a "final polishing" of the effluent water. The separator 20 discharges a continuous stream of water having an oil content less than the oil content of the produced water admitted to the vessel 10 and preferably less than 30 parts per million oil. Oil-saturated fibrous material removed by the filter is preferably continuously or periodically removed from the filter by means such as a scraper (not shown) and is advantageously returned to vessel 10 for continued use in the emulsion breaking process via means such as conduit 22. Any free oil collected in the separator means can be recycled to contacting vessel 10 along with the oil-saturated fibrous material. In cases where large amounts of free oil are collected in separator means 20, it may be advantageous to withdraw a separator stream of separated oil from this separator 20 as shown in FIG. 1. This oil can, for example, be withdrawn from the top of a settling zone within the separator 20.

In some cases, it is preferable that the separator means 20 comprise means other than a filter for removing fibers from the aqueous phase effluent. For example, when a substantial amount of particulate solid, such as sand, is present in the fluid to be treated, the solid may plug a filter. In such cases, the separator 20 may comprise a conventional flotation cell or other apparatus capable of separating the oil-saturated fibrous material as well as particulate matter and coalesced free-oil droplets from the effluent passing from vessel 10 through conduit 12. In this case, it may be necessary to use a second stage separator (not shown) to remove uncoalesced oil droplets from the water discharged from separator means 20. This second stage separator may advantageously comprise another fiber-containing contacting vessel similar to vessel 10 which discharges fiber-containing aqueous effluent through a filter means as described above.

Oil withdrawn from contacting vessel 10 through outlet 11 in some instances may contain some water or unbroken emulsion and/or a minor amount of fibrous material. In such cases, it may be desirable to pass this oil through a treating means 33 such as a filter, centrifugal type separator or a conventional settling tank, to separate the contaminant from the oil. The aqueous phase and fibrous material recovered from this separator may, if desired, be recycled into contacting vessel 10.

Figure 2:
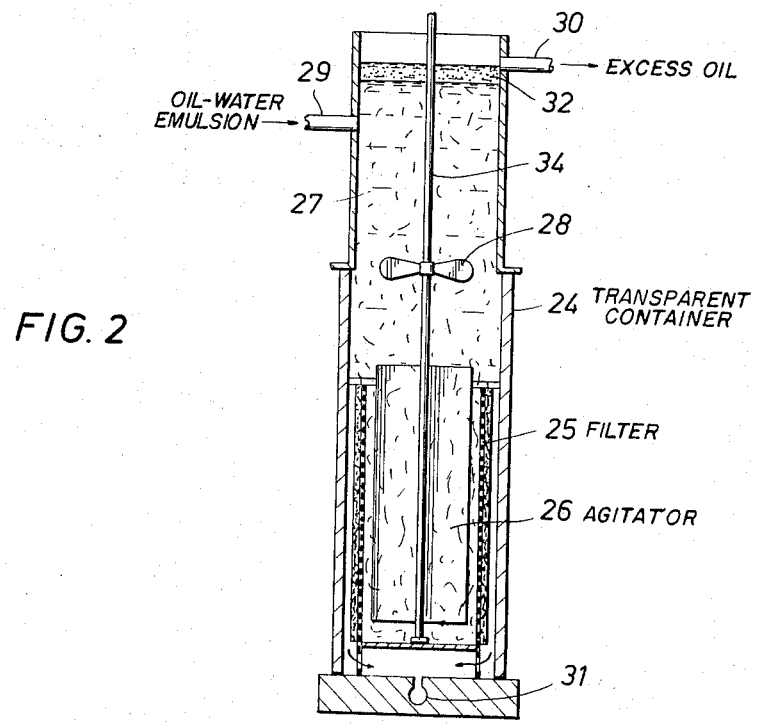
FIG. 2 is a cross-sectional view of an embodiment of apparatus suitable for the practice of this invention which was used in the laboratory test described in the Example.

Referring now to FIG. 2, we see an alternate embodiment of apparatus suitable for the practice of this invention. In this embodiment a contacting vessel 24 is provided with an internal filter means 25 and means such as a paddle 26 for removing a filter cake comprising oil saturated fibrous material from the filter means 25 and returning this fibrous material to a contacting zone 27 within the vessel 24. As in the embodiment of FIG. 1, the vessel is provided with agitating means, such as impeller 28 mounted on shaft 34, for agitating the liquid contents of the contacting zone 27, and with emulsion inlet means 29, oil outlet means 30 and an aqueous phase outlet 31. The vessel 10 is loaded with a continuous-phase suspension or slurry of a disperse-phase trapping fibrous material. To separate oil and substantially oil-free water from an oil-in-water emulsion, the vessel 24 is preferably loaded with an aqueous suspension of shredded newsprint or newspaper.

In operation, oil-in-water emulsion is flowed into the vessel 24 through inlet 29. Shaft 34 is rotated by motor means (not shown) causing impeller 28 to agitate the slurry in contacting zone 27. This promotes contact of oil droplets with fluidized fibers. Once the fibrous material in the contacting zone has become oil saturated, free oil rises to the top of the vessel 24 and forms a free oil layer 32 on top of the substantially aqueous phase in the contacting zone 27. Oil is withdrawn from this layer through outlet 30. Simultaneously, aqueous phase flows through cylindrical filter means 25 and out of the vessel 24 through outlet 31. This aqueous effluent is substantially solids-free since fibrous material has been removed by filter 25. The aqueous phase is substantially reduced in oil content compared to the emulsion admitted to the vessel. In a preferred mode of operation, emulsion having an oil content greater than 30 ppm is admitted to vessel 24 through inlet 29 and water having an oil concentration of less than 30 ppm, and preferably less than 10 ppm is withdrawn through outlet 31.

As aqueous phase flows through filter means 25, fibrous material collects on the inside of the filter to form a filter cake (not shown). A small filter cake buildup, preferably less than 1 centimeter thick, is advantageous in that disperse-phase droplets which may be contained in fluid flowing through this layer of fibers are trapped in, or otherwise separated from the aqueous phase by the filter cake. However, excessive buildup of filter cake is not preferred and, therefore, paddle 26 is employed to continuously return at least some of the fibers in the filter cake to the contacting zone either by actually scraping the filter cake or by creating sufficient turbulence immediately adjacent the filter cake to dislodge fibers.

EXAMPLE

A laboratory scale model of the apparatus of FIG. 2 was used to separate oil from a laboratory-prepared emulsion comprising 500 parts per million of 35° API crude oil having a viscosity on the order of 1-2 centipoise dispersed in a simulated oil field brine having a total dissolved salt ($NaCl$, $CaCl_2$, $MgCl_2$) concentration of 10 percent. The oil was dispersed in droplets ranging in diameter from about 2 microns to about 10 microns with the majority of droplets being about 6 microns in diameter.

The contacting vessel 24 was formed from a lucite cylinder having a 5 inch internal diameter and a working height of 22 inches. The height of the cylindrical filter 25 was 10 inches. The filter 25 comprised a 20 mesh stainless steel screen covered on the inside with cotton fabric and surrounded on the outside by glass wool held in place by cheese cloth. The internal diameter of the filter 25 was 4 inches and the gap between the external edge of the paddle 26 and filter 25 was about one-eighth inch. The impeller 28 was a 3 inch diameter, "low lift pitch," Fawcett Mixed Flow Impeller manufactured by the M. F. Fawcett Co., Macedonai, Ohio, which is of the type described in U.S. Pat. No. 2,787,448.

The vessel was loaded with an aqueous slurry comprising 5,000 ppm shredded newspaper formed by shredding a portion of a metropolitan newspaper in a conventional domestic blender. The resulting shredded paper consisted primarily of fibers of mean diameter 10-15 microns and length 800-2,000 microns. 5,000 cc of this slurry was added to the vessel 24. Thus, the vessel contained 25 grams of shredded paper.

In operation, the emulsion to be broken was flowed into the vessel at a rate of 500 cc per minute. Shaft 34 was rotated at 110-120 rpm, and substantially oil-free water was withdrawn through outlet 31 at a flow rate approximately equal to the rate of emulsion input. After about 1 hour a free oil layer 32 formed at the top of fluid in the vessel 24. This oil layer contained to increase in thickness until it reached outlet 30 through which it overflowed into a collecting vessel (not shown).

After 168 hours of continuous operation the oil content of aqueous effluent from the contacting vessel was measured by a benzene extraction-photometric analytical procedure and found to be 3 ppm. After 353 hours of continuous operation, effluent oil content was again measured and found to be 4 ppm. To this time 5,295 grams (about 6 liters) of oil had been removed from 10,590 liters of dilute emulsion. Shortly thereafter the experiment was terminated due to mechanical failure of the apparatus. During the approximately two weeks of continuous operation no deterioration of the shredded newspaper was observed and no additional newspaper was added to the system.

It can be seen that a prime advantage of the present invention is that emulsion is continuously broken without generating substantial amounts of waste, oil-saturated solids from which oil must be separated and without requiring large settling facilities for separating coalesced oil from water. A given quantity of fiber can be used long after it has become saturated with oil at conditions prevailing in the contacting vessel. Generally a quantity of fiber can be used until it has separated at least 10 times its weight of disperse phase. In most applications, fiber life far exceeds this limit, e.g., in the example above, at the time the experiment was terminated over 200 times as much oil by weight had been recovered as there was shredded paper in the contacting vessel without any significant reduction in process efficiency.

The mechanism by which the process separates disperse phase from the emulsion is not completely understood at the present time. It is believed that in the agitated contacting zone, e.g. zone 23 of vessel 10, fibers intertwine to form clumps or groups of two or more fibers which are capable of trapping disperse-phase, e.g. oil, droplets without the droplet necessarily adherring to or even contacting the fibers (as stated above, it is advantageous for the fibers to be predominately continuous phase wet). As a clamp of fibers and trapped disperse-phase moves through the contacting zone more droplets are encountered. These drops coalesce with the previously trapped drops to form larger drops. It is theorized that clumps of fibers are also continuously disintegrating into disassociated fibers in the zone of agitation. When this occurs, enlarged drops previously trapped are free to rise or fall in the vessel due to the relative density difference between disperse-phase and continuous-phase liquids.

Thus, it is believed that the process works by a dynamic mechanism in which droplets are continually being trapped by clumps of fibers and in which clumps of fibers are continuously disintegrating to free droplets. The fibrous material becomes disperse-phase saturated at the point at which the rate of droplet trapping equals the rate of droplet loss due to clump disintegration. At this point, the process is substantially at steady state and as long as operating conditions within the contacting vessel are not changed, the total amount of disperse phase trapped in clumps of fibers at any given time is substantially constant.

We claim as our invention:

1. Apparatus for continuously separating oil and water from an oil-in-water emulsion comprising:
    a vessel;
    an aqueous suspension of preferentially water wet, substantially oil-saturated, oil-trapping, oil-coalescing, non-granular, disassociated, cellulosic, fibrous material contained within the vessel;
    agitating means for agitating the aqueous suspension of substantially oil-saturated, oil-trapping fibrous material contained within the vessel in such a manner that oil and water separate;
    oil outlet means adjacent the top of the vessel for withdrawing a separated oil phase from the vessel;
    said agitating means lying below said separated oil phase;
    aqueous phase outlet means positioned on said vessel below the oil outlet means for continuously withdrawing an aqueous phase from the vessel; and
    means for admitting an oil and water emulsion into the vessel at a point remote from said oil and water outlets.

2. The apparatus of claim 1 wherein the fibrous material consists of discrete fibers 100 to 10,000 microns in length.

3. The apparatus of claim 1 wherein the fibrous material concentration in the aqueous suspension is within the range 500 ppm to 20,000 ppm.

4. Apparatus for continuously separating oil and water from an oil-in-water emulsion comprising:
    a vessel;
    an aqueous suspension of 500 ppm. to 20,000 ppm. of shredded newsprint contained within the vessel;
    agitating means for agitating the aqueous suspension of substantially oil-saturated, oil-trapping fibrous material contained within the vessel;
    means for admitting emulsion into the vessel;
    oil outlet means adjacent the top of the vessel for withdrawing an oil phase from the vessel;
    aqueous phase outlet means positioned on the vessel below the oil outlet means for continuously withdrawing an aqueous phase from the vessel; and
    means in said vessel removing said shredded newsprint from the aqueous phase withdrawn through the aqueous phase outlet.

5. The apparatus of claim 1 further comprising:
    means for removing substantially oil-saturated, oil-trapping, fibrous material from the aqueous phase withdrawn through the aqueous phase outlet.

6. The apparatus of claim 5 further comprising:
    means for returning said substantially oil-saturated, oil-trapping, fibrous material removed from the aqueous phase withdrawn through the aqueous phase outlet to the aqueous suspension of substantially oil-saturated, oil-trapping fibrous material contained within the vessel.

7. The apparatus of claim 1 wherein the fibrous material is shredded cellulose.

8. The apparatus of claim 7 wherein the fibrous material is shredded newsprint.

* * * * *